(12) United States Patent
Schaechinger

(10) Patent No.: US 9,999,912 B2
(45) Date of Patent: Jun. 19, 2018

(54) SHEET METAL DENT REPAIR TOOL EXCHANGE HANDLE

(71) Applicant: Ulrich Schaechinger, Nagold (DE)

(72) Inventor: Ulrich Schaechinger, Nagold (DE)

(73) Assignee: LAKA-TOOLS Ulrich Schaechinger, Nagold (DE)

(*) Notice: Subject to any disclaimer, the term of this patent is extended or adjusted under 35 U.S.C. 154(b) by 0 days. days.

(21) Appl. No.: 15/594,614

(22) Filed: May 14, 2017

(65) Prior Publication Data

US 2017/0333966 A1 Nov. 23, 2017

(30) Foreign Application Priority Data

May 20, 2016 (DE) .................... 20 2016 102 687 U

(51) Int. Cl.

| B21D 1/06 | (2006.01) |
| B21D 1/08 | (2006.01) |
| B23B 31/107 | (2006.01) |
| B21D 1/12 | (2006.01) |
| B21J 13/03 | (2006.01) |
| B21J 13/02 | (2006.01) |
| B21J 13/08 | (2006.01) |

(52) U.S. Cl.
CPC ............ *B21D 1/08* (2013.01); *B21D 1/06* (2013.01); *B21D 1/12* (2013.01); *B21J 13/02* (2013.01); *B21J 13/03* (2013.01); *B21J 13/08* (2013.01); *B23B 31/1071* (2013.01)

(58) Field of Classification Search
CPC .... B21D 1/08; B21D 1/06; B21D 1/12; B23B 31/1071; B21J 13/08; B21J 13/03; B21J 13/02

USPC .......................................................... 72/479
See application file for complete search history.

(56) References Cited

U.S. PATENT DOCUMENTS

| 1,897,142 A * | 2/1933 | Peterson ................... B21D 1/12 |
| | | 24/458 |
| 2,600,723 A * | 6/1952 | Back ........................ B21D 1/06 |
| | | 72/412 |
| 5,479,804 A * | 1/1996 | Cook ....................... B21D 1/06 |
| | | 33/608 |
| 7,104,108 B2 * | 9/2006 | Roche ...................... B21D 1/06 |
| | | 72/458 |

FOREIGN PATENT DOCUMENTS

| DE | 102004028568 B4 | 1/2001 |
| DE | 20109742 U1 | 11/2001 |
| DE | 202004003982 U1 | 7/2004 |
| JP | H11188657 A | 12/1997 |

* cited by examiner

Primary Examiner — David B Jones
(74) Attorney, Agent, or Firm — Von Rohrscheidt Patents

(57) ABSTRACT

A sheet metal dent repair hook exchange handle including a hand grip; and a handle element coupling, wherein the handle element coupling includes a receiver for a coupling element that is connectable or connected with a shaft of a sheet metal dent repair hook, and a locking arrangement for a disengageable support of the coupling element against an unintentional axial movement out of the handle element coupling, and an arresting arrangement for a disengage able support of the coupling element in an inner teething arranged in the handle element coupling. The locking arrangement includes locking devices that engage a recess in a portion of the cylindrical coupling element which portion is insertable into the handle element coupling.

11 Claims, 3 Drawing Sheets

SHEET METAL DENT REPAIR TOOL EXCHANGE HANDLE

RELATED APPLICATIONS

This application claims priority from and incorporates by reference German Patent Application DE 20 2016 102 687.3 filed on May 20, 2016.

FIELD OF THE INVENTION

The instant invention relates to a sheet metal dent repair hook exchange handle including a grip element and a grip element coupling. The invention also relates to a coupling element and a sheet metal dent repair hook with the coupling element for an insertion into the exchange handle.

BACKGROUND OF THE INVENTION

When repairing body dents without paint damage it is required to use various dent repair hooks according to the application. Many dent repair hooks with different shapes are known in the art that include exchange handles that are rotatable in 45° increments relative to the longitudinal axis of the dent repair hook in order to be able to rotate the exchange handle relative to the dent repair hook as required so that forces can be applied in an optimum manner. It is a disadvantage of the known handles that there is no safety against rotation so that the dent repair hook can slide out of the exchange handle and there is a risk that the dent repair hook can fall into an opening at the vehicle body and that the exchange handle has to be removed completely when switching the handle into another position and that the handle has to be reapplied.

BRIEF SUMMARY OF THE INVENTION

It is an object of the instant invention to overcome the disadvantages recited supra and to propose a sheet metal dent repair hook exchange handle that is usable for different sheet metal dent repair hooks and also provides a safety against unintentional sliding of the sheet metal dent repair hook out of the exchange handle when rotating the exchange handle relative to the dent repair hook.

The object is achieved according to the invention by a sheet metal dent repair hook exchange handle including a hand grip; and a handle element coupling including a receiver for a coupling element that is connectable or connected with a shaft of a sheet metal dent repair hook, a locking arrangement for a disengageable support of the coupling element against an unintentional axial movement out of the handle element coupling, and an arresting arrangement for a disengage able support of the coupling element in an inner teething arranged in the handle element coupling. Additional advantageous embodiments are provided in the dependent claims.

The invention also relates to a coupling element is claimed for insertion into the sheet metal dent repair hook exchange handle which coupling element is adapted to the sheet metal dent repair hook exchange handle and a sheet metal dent repair hook with the coupling element.

According to the invention the handle element coupling includes a receiver for a coupling element that is connectable or connected with a shaft of a sheet metal dent repair hook and a locking device for disengageable support of the coupling element against an unintentional axial movement out of the handle element coupling and an arresting device for a disengageable support of the coupling element in an inner teething in the handle element coupling. The coupling element is supported in the handle element coupling in a disengageable manner and rotatably supported relative to the handle element coupling about a longitudinal axis formed by the shaft, the coupling element and at least partially by the handle element coupling. The exchange handle is advantageously angled and made from a grip element and a handle element coupling arranged at angle relative to the grip element. The handle element coupling is advantageously axially aligned with the coupling element and the shaft of the sheet metal dent repair hook. The sheet metal dent repair hook can be connected at a coupling end of the shaft with the coupling element. At the other end of the shaft here is a hook that is configured according to the respective technical application.

The coupling element advantageously has a cylindrical shape and in a portion that is insertable into the handle element coupling, the coupling element has an indentation at least in a portion of the coupling element which indentation is configured to receive locking devices that are arranged at the handle element coupling. Depending on the configuration of the locking devices at the handle element coupling the recess at the circumference of the insert able portion can be configured as an annular groove or by a number of individual recesses.

According to another embodiment of the invention the coupling element includes an external teething at an end oriented towards the handle element coupling wherein the external teething is engageable and disengage able in an axial direction with an inner teething arranged in the handle element coupling. Using this teething the exchange handle is rotatable relative to the sheet metal dent repair hook wherein a rotatability in 15° increments is advantageously provided.

The coupling element advantageously includes an axial cavity with a face wall for receiving the shaft of the sheet metal dent repair hook. Thus, the coupling element is firmly connectable with the shaft. The axial cavity can have a circular cross section in one embodiment so that a fixation of the shaft in the coupling element through welding or gluing or another suitable measure is required.

Another option is that the cavity has a polygonal cross section at least in the insertion portion of the shaft into the coupling element, so that rotating the dent repair hook relative to the coupling element is prevented for a shaft end that is accordingly adapted. In this case additional devices for preventing an axial sliding of the dent repair hook from the cavity have to be provided.

Furthermore the coupling element advantageously includes an axial bore hole in the face wall for passing an arresting device through. The arresting device is used for keeping the coupling element with the inner teething in engagement with the outer teething arranged in the handle element coupling or release the engagement.

Advantageously the handle element coupling includes a coupling housing with an axial bore hole into which the coupling element is insertable on one side and the arresting device for the coupling element is arranged on the other side. The arresting arrangement is fixated in the handle element coupling.

Advantageously the arresting arrangement includes a sleeve that is arranged in the axial direction wherein the sleeve protrudes through a face bore hole into the cavity arranged in the coupling element. The sleeve itself includes an arresting arrangement in the portion of the cavity wherein the arresting device arrests an axial movement of the coupling element. Thus, the arresting arrangement includes arresting devices, advantageously a bolt that is movable in the axial direction in the sleeve against a spring force in order to release the arresting devices.

Advantageously the bolt includes at least one recess for receiving the arresting devices at a circumference of the bolt in a portion or the arresting devices when the bolt is moved against a spring force wherein the arresting devices include at least one bearing ball. In order for the bearing balls not to be able to fall out, the race in which the balls move is configured cone shaped which is known in the art.

According to another advantageous embodiment the locking devices arranged at the handle element coupling are configured as a push-pull lock and include a push pull locking ring that is moveable in the axial direction against a spring, wherein the push pull locking ring releases the locking devices engaging the recess when a movement against the spring force is performed. The push pull locking devices are well-known locking devices using bearing balls, spring elastic rings or similar.

A sheet metal dent repair hook configured according to the invention for insertion into a previously described sheet metal dent repair hook exchange handle includes a coupling element that is connected with the shaft of the sheet metal dent repair hook.

The sheet metal dent repair hook exchange handle configured according to the invention facilitates providing and exchange handle for different sheet metal dent repair hooks, wherein the coupling element for the sheet metal dent repair hook exchange handle is either permanently connected with the respective sheet metal dent repair hook depending on the configuration and the sheet metal dent repair hook is inserted with the coupling element torque into the exchange handle or the sheet metal dent repair hook is inserted into the exchange handle torque proof itself through a respective configuration at the shaft end when changing the sheet metal dent repair hook. Thus the sheet metal dent repair hook exchange handle is universally useable. In case the sheet metal dent repair hook is firmly connected with the coupling element, the sheet metal dent repair hook can be secured through the push-pull interlocking through axial insertion into the handle element coupling. The coupling element that is arranged in the handling element coupling is supported on the one hand side by the push-pull interlocking and additionally supported by the arresting arrangement and additionally supported by the arresting arrangement in the inner teething of the handle element coupling. When rotating the handle element coupling relative to the coupling element or the sheet metal dent repair hook it is facilitated by the axial movement of the bolt arranged in the arresting arrangement to disengage the outer teething of the coupling element from the inner teething of the handling element coupling. The additional push-pull interlocking prevents that the coupling element and thus also the sheet metal dent repair hook disengages from the handling element coupling.

Taking the coupling element out of the handle element coupling is only possible when the bolt of the arresting arrangement as well as the push-pull locking ring of the locking arrangement are simultaneously moved against the respective spring force. An additional advantage of the sheet metal dent repair hook exchange handle according to the invention is that it is provided with a teething in 15° increments and thus facilitates an adaptation in small steps. The user can thus use different sheet metal dent repair hooks with a sheet metal dent repair hook exchange handle when the sheet metal dent repair hooks are provided with an adapted coupling element.

BRIEF DESCRIPTION OF THE DRAWINGS

Subsequently the invention is described in more detail based on an embodiment with reference to appended drawing figures, wherein individual features described in the patent claims and in the description can be used by themselves or in combination, wherein:

DETAILED DESCRIPTION OF THE INVENTION

Figure 1:
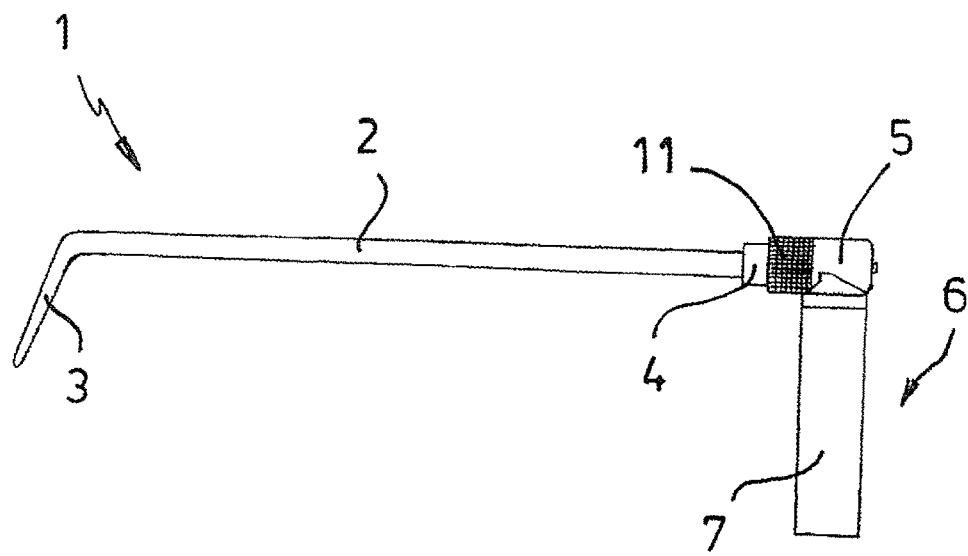
FIG. 1 illustrates a sheet metal dent repair hook in the sheet metal dent repair hook exchange handle.

FIG. 1 illustrates a sheet metal dent repair hook 1 including a shaft 2 including a hook 3 at one end and a coupling element 4 at another end. The sheet metal dent repair hook 1 is inserted with the coupling element 4 into a handle element coupling 5 of the sheet metal dent repair hook exchange handle 6. At the handle element coupling 5 a hand grip 7 is arranged at a right angle to the handle element coupling 5 certainly the sheet metal dent repair hook exchange handle grip 6 can also have a piston shape.

Figure 2:
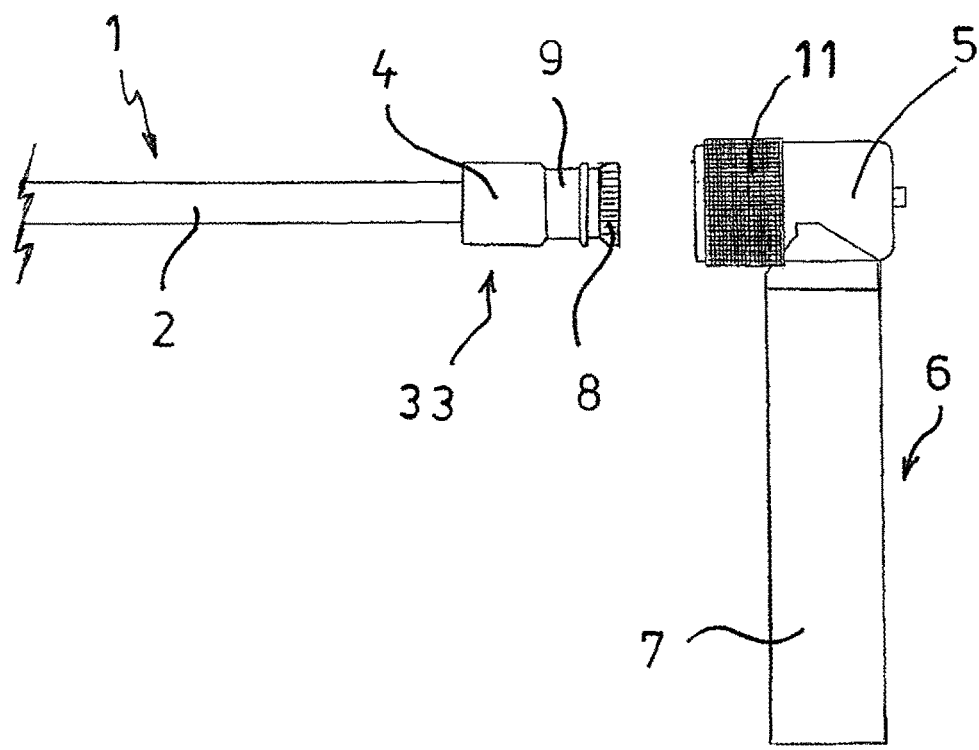
FIG. 2 illustrates a shaft end of the sheet metal dent repair hook with a coupling element disengaged from the sheet metal dent repair hook exchange handle.
Figure 3A:
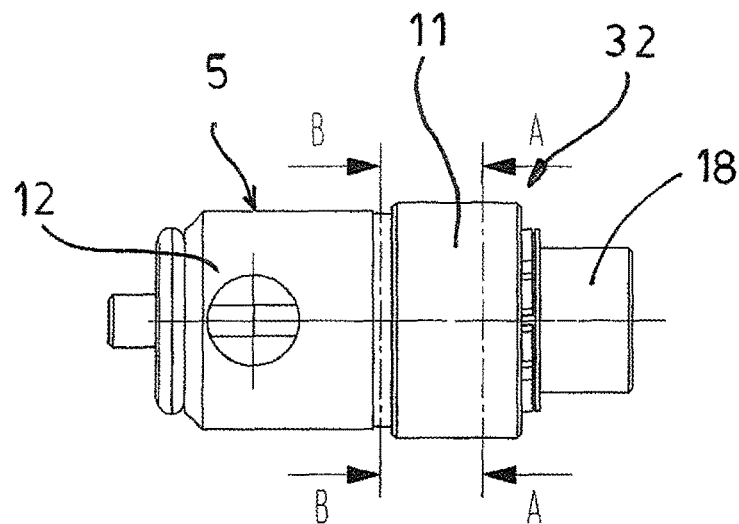
FIG. 3 illustrates the handle element coupling in top view (FIG. 3A), in a longitudinal sectional view (FIG. 3B) and in a cross sectional view along the lines A-A (FIG. 3C) through the push-pull interlocking arrangement and in a cross sectional view B-B (FIG. 3D) through the teething.
Figure 3B:
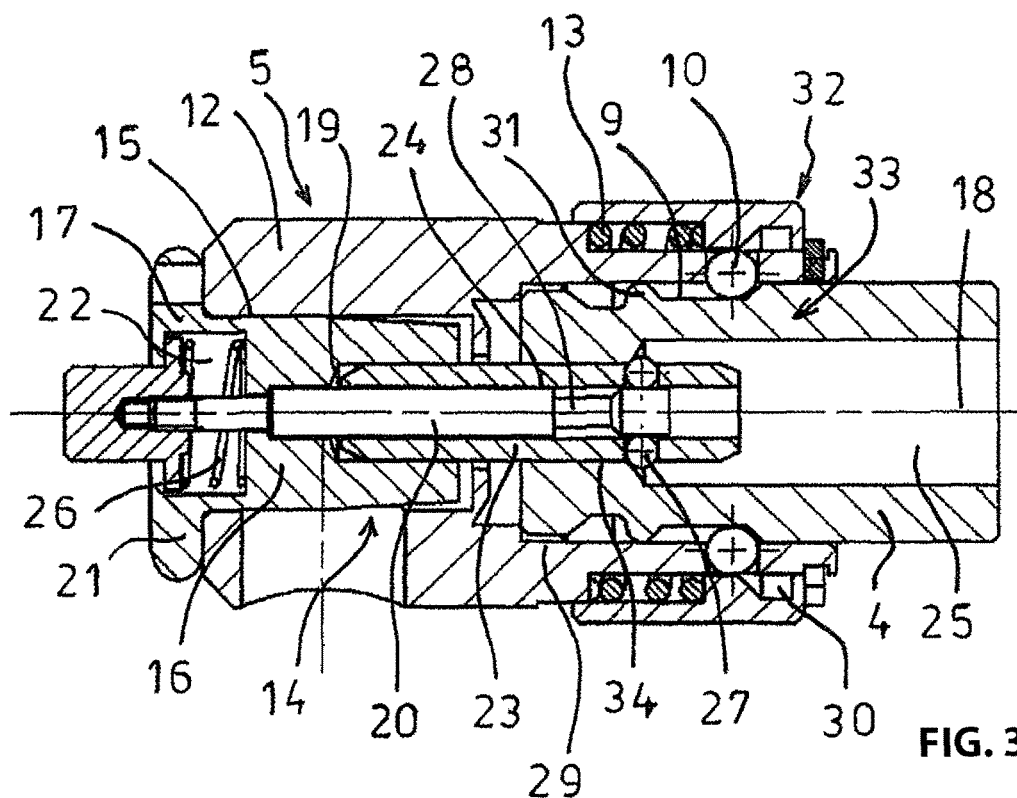
Figure 3C:
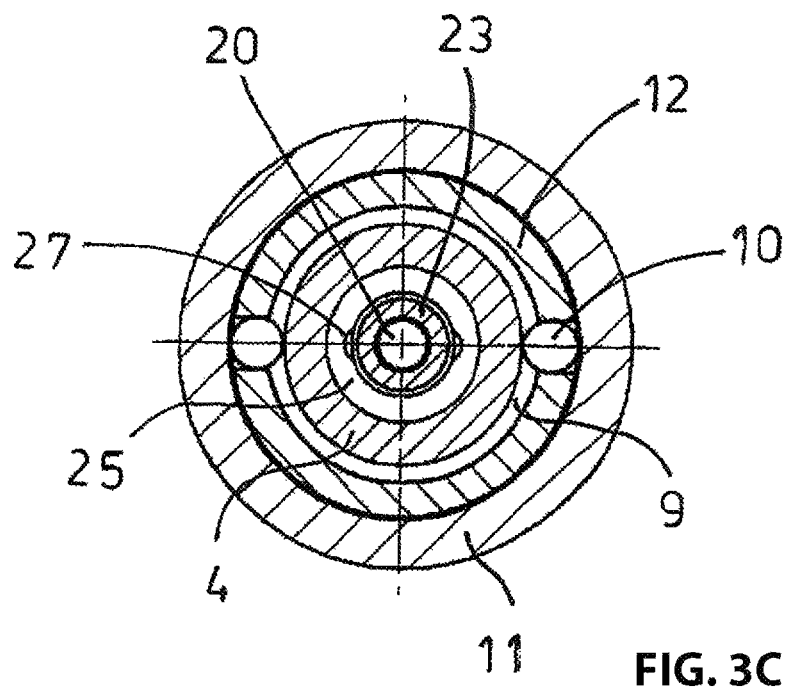
Figure 3D:
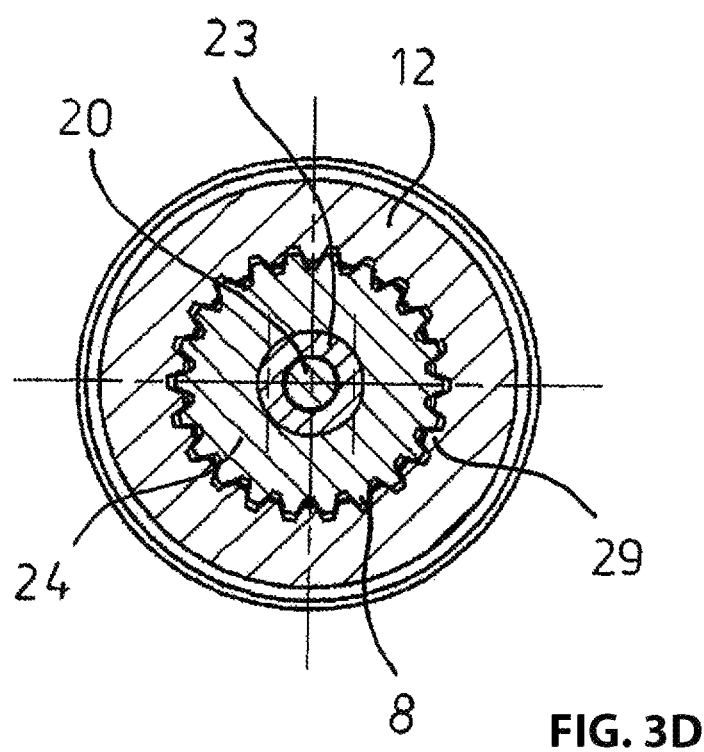

FIG. 2 illustrates an end of the shaft 2 of the sheet metal dent repair hook 1 of FIG. 1 including the coupling element 4 that is pulled out of the handle element coupling 5. The coupling element 4 includes an outer teething 8 at an end oriented towards the sheet metal dent repair hook exchange handle 6. Furthermore a recess 9 is arranged at a circumference of the coupling element 4 adapted to the handle element coupling 5 in a portion 33 configured to engage interlocking devices 10 that are not illustrated in this drawing figure wherein the interlocking devices are arranged in the handle coupling 5 and subsequently illustrated in FIG. 3 and described in more detail. A push-pull locking ring 11 is arranged on an outside of the handle element coupling 5 and forms an interlocking arrangement 32.

FIG. 3 illustrates the handle element coupling 5 with the inserted element coupling element 4 in detail in different illustrations. As stated supra the handle element coupling 5 includes a push-pull locking ring 11 of a locking device 32 wherein the locking ring is circumferentially arranged and mounted axially movable on an outside of a coupling housing 12 wherein the axial movement is performed against a force of a spring 13 in the axial direction. An arresting arrangement 14 is arranged at an end of the coupling housing 12 that is oriented away from the coupling element 4, wherein the arresting arrangement protrudes into an axial bore hole 15 of the coupling housing 12. Thus, the arresting arrangement 14 includes a pinion 16 which is run through the axial bore hole 15 of the coupling housing 12. The pinion 15 includes a flange 17 which contacts a face of the coupling housing 12 and closes the axial bore hole 15. In the longitudinal axis 18 of the coupling element 4 and the handle element coupling 5 and thus also of the axial bore hole 15 and of the pinion 16 a bolt 20 is arranged in the pinion 16 in a longitudinal bore hole 19 wherein the bolt is movable by a plunger 21 against a force of a spring 26 which presses against the pinion 16 in a cavity 22 wherein the bolt 20 is movable in the axial direction towards the coupling element 4. The bolt 20 is supported in a sleeve 23 which protrudes through a bore hole 34 in the face wall 24 of the coupling element 4 into a cavity arranged in the coupling element 4. In the sleeve 23 there are arresting devices 27 configured as bearing balls which move into an unlocking portion 28 at the bolt 20 configured as a recess when the bolt 20 moves in a direction towards the coupling element 4, which facilitates an axial movement of the coupling element 4 away from the pinion 16. Thus, the outer teething 8 at the coupling element 4 comes out of engagement from the inner teething 29 arranged in the coupling housing 12. This movement, however, is prevented by the interlocking devices 10 of the push-pull interlocking wherein the interlocking devices 10 engage the recess 9 of the coupling element 4. Thus, a movement of the coupling element terminates at another end 31 of the recess 9 illustrated in FIG. 3. A complete pull out of the coupling element 4 from the handle element coupling 5 is only possible when the movement of the push-pull locking ring 11 against a force of the spring 13 simultaneously facilitates that the locking devices 10 can move out of the recess 9 into the recess 30 that is arranged in the push pull interlocking ring 11.

What is claimed is:

1. A sheet metal dent repair hook exchange handle, comprising:
   a hand grip connected with a handle element coupling,
   wherein the handle element coupling includes:
      a coupling element connectable with a shaft of a sheet metal dent repair hook,
      a locking arrangement disengageably connects the coupling element and the handle element coupling by providing disengageable support of the coupling element while preventing an unintentional axial movement out of the handle element coupling, and
      an arresting arrangement fixated in the handle element coupling that provides disengageable support of the coupling element with an inner teething arranged in the handle element coupling, and
   wherein the locking arrangement includes locking devices that engage a recess in a portion of the cylindrical coupling element which portion is insertable into the handle element coupling.

2. The sheet metal dent repair hook exchange handle according to claim 1,
   wherein the inner teething is engageable with and disengageable from an external teething arranged at an end of the coupling element, and
   wherein the end of the coupling element end is oriented towards the handle element coupling.

3. The sheet metal dent repair hook exchange handle according to claim 1,
   wherein the handle element coupling includes a coupling housing with an axial bore hole,
   wherein the coupling element is insertable into the axial borehole on one side, and
   wherein the arresting arrangement for the coupling element is arranged in the axial borehole on another side.

4. The sheet metal dent repair hook exchange handle according to claim 3,
   wherein the arresting arrangement includes an axially arranged sleeve which protrudes through a face bore hole into a cavity arranged in the coupling element, and
   wherein the axially arranged sleeve includes arresting devices for the coupling element at one end.

5. The sheet metal dent repair hook exchange handle according to claim 4, wherein the arresting arrangement includes a bolt that is movable in the sleeve in the axial direction against a force of a spring to release the arresting devices.

6. The sheet metal dent repair hook exchange handle according to claim 5,
   wherein the bolt includes at least one recess in a portion of the arresting devices at a circumference in order to receive the arresting devices when the bolt (20) moves against a force of the spring, and
   wherein the arresting devices include at least one bearing ball.

7. The sheet metal dent repair hook exchange handle according to claim 1,
   wherein the interlocking devices arranged at the handle element coupling include a push-pull interlocking ring that is movable against a force of a spring in the axial direction, and
   wherein the push-pull interlocking ring releases the interlocking devices that engage the recess of the coupling element when the push-pull interlocking ring is moved against the force of the spring.

8. A coupling element configured to be inserted into the sheet metal dent repair hook exchange handle according to claim 1,
   wherein the coupling element has a cylindrical shape and includes a recess at least in portions of a portion that is insertable into the handle element coupling, and
   wherein the recess is configured to receive interlocking devices arranged in the handle element coupling.

9. The coupling element according to claim 8, further comprising an outer teething that is arranged at an end of the coupling element that is oriented towards the handle element coupling.

10. The coupling element according to claim 8, further comprising an axial cavity with a face wall for receiving the shaft of the sheet metal dent repair hook, wherein the face wall includes an axial bore hole for passing the arresting arrangement through.

11. The sheet metal dent repair hook configured to be inserted into the sheet metal dent repair hook exchange handle including the coupling element according to claim 8.

* * * * *